United States Patent
Paravatha et al.

(10) Patent No.: US 12,190,087 B2
(45) Date of Patent: *Jan. 7, 2025

(54) CONFIGURABLE DEPLOYMENT OF DATA SCIENCE MODELS

(71) Applicant: Discover Financial Services, Riverwoods, IL (US)

(72) Inventors: Prasad Paravatha, Chicago, IL (US); Vivek Mathew, Schaumburg, IL (US); Divya Gone, Palatine, IL (US)

(73) Assignee: Discover Financial Services, Riverwoods, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,048

(22) Filed: Jan. 8, 2024

(65) Prior Publication Data

US 2024/0220221 A1 Jul. 4, 2024

Related U.S. Application Data

(63) Continuation of application No. 17/576,588, filed on Jan. 14, 2022, now Pat. No. 11,868,749.

(51) Int. Cl.
*G06F 8/60* (2018.01)
*G06F 3/0482* (2013.01)
*G06F 3/0484* (2022.01)

(52) U.S. Cl.
CPC ............. *G06F 8/60* (2013.01); *G06F 3/0482* (2013.01); *G06F 3/0484* (2013.01)

(58) Field of Classification Search
CPC ....................................................... G06F 8/60

(Continued)

(56) References Cited

U.S. PATENT DOCUMENTS 6,865,737 B1 * 3/2005 Lucas ................. G06F 8/61
717/178
8,266,616 B1 * 9/2012 Jacquot ............... G06F 8/65
717/121

(Continued)

FOREIGN PATENT DOCUMENTS

CN 111126626 A1 5/2020
WO 2021244734 A1 12/2021

OTHER PUBLICATIONS

International Searching Authority. International Search Report and Written Opinion issued in International Application No. PCT/US2022/053123, mailed on Apr. 28, 2023, 9 pages.

(Continued)

*Primary Examiner* — Reza Nabi
(74) *Attorney, Agent, or Firm* — Lee Sullivan Shea & Smith LLP

(57) ABSTRACT

An example computing platform is configured to (a) cause a client device associated with a user to display an interface for deploying a new data science model, where the interface presents the user with a list of deployment templates, and where each of the deployment templates includes data specifying (i) a respective executable model package and (ii) a respective set of execution instructions for the respective executable model package, (b) receive, from the client device, data indicating (i) a user selection of a given deployment template for use in deploying the new data science model and (ii) a given set of configuration parameters for use in deploying the new data science model, and (c) use the given executable model package, the given set of execution instructions, and the given set of configuration parameters to deploy the new data science model.

20 Claims, 6 Drawing Sheets

(58) Field of Classification Search
USPC .......................................................... 715/771
See application file for complete search history.

(56) References Cited

U.S. PATENT DOCUMENTS

| | | | | |
|---|---|---|---|---|
| 10,089,676 | B1* | 10/2018 | Gupta | G06Q 30/0633 |
| 10,318,265 | B1* | 6/2019 | To | H04L 67/34 |
| 10,326,845 | B1* | 6/2019 | Jaeger | H04L 41/022 |
| 10,534,595 | B1* | 1/2020 | Lisuk | G06N 20/20 |
| 10,908,970 | B1* | 2/2021 | Arivazhagan | G06F 9/54 |
| 11,442,763 | B2* | 9/2022 | Iyer | G06F 9/45558 |
| 11,693,642 | B2* | 7/2023 | Li | G06F 9/45558 718/1 |
| 2003/0229884 | A1* | 12/2003 | Carr | G06F 16/2465 717/101 |
| 2006/0245354 | A1* | 11/2006 | Gao | H04L 41/5096 379/221.09 |
| 2006/0253848 | A1* | 11/2006 | Mathieu | G06F 8/61 717/168 |
| 2008/0147675 | A1* | 6/2008 | Engehausen | H04L 67/34 |
| 2013/0041987 | A1* | 2/2013 | Warno | G06F 9/45558 709/220 |
| 2015/0186132 | A1* | 7/2015 | Oliveri | G06F 8/34 717/120 |
| 2016/0110183 | A1* | 4/2016 | Fu | G06F 8/63 717/169 |
| 2016/0132805 | A1* | 5/2016 | Delacourt | G06Q 10/00 705/7.23 |
| 2016/0132806 | A1* | 5/2016 | To | G06Q 10/06313 705/7.23 |
| 2016/0132808 | A1* | 5/2016 | To | G06Q 10/06315 705/7.25 |
| 2016/0170742 | A1 | 6/2016 | Pallath et al. | |
| 2017/0063629 | A1* | 3/2017 | Ciano | H04L 41/12 |
| 2017/0357893 | A1 | 12/2017 | Dexter et al. | |
| 2018/0191682 | A1* | 7/2018 | Liu | H04L 41/0895 |
| 2018/0373551 | A1* | 12/2018 | Christensen | G06F 9/44505 |
| 2019/0065232 | A1* | 2/2019 | Do | H04L 41/0806 |
| 2019/0340524 | A1 | 11/2019 | Kirchhoff et al. | |
| 2020/0133651 | A1* | 4/2020 | Holzer | G06F 8/65 |
| 2020/0264858 | A1* | 8/2020 | Li | H04L 67/34 |
| 2020/0264897 | A1* | 8/2020 | Popo | G06F 9/45558 |
| 2020/0304383 | A1* | 9/2020 | Bajaj | H04L 41/0843 |
| 2020/0387357 | A1* | 12/2020 | Mathon | G06F 9/4411 |
| 2021/0360426 | A1* | 11/2021 | Kumar | G06F 9/50 |
| 2022/0329584 | A1* | 10/2022 | Sharma | H04L 9/30 |
| 2022/0337668 | A1* | 10/2022 | Procházka | H04L 41/0866 |
| 2022/0414478 | A1* | 12/2022 | Karri | G06F 21/53 |
| 2023/0083843 | A1* | 3/2023 | Sheela | G06F 16/23 707/803 |
| 2023/0085985 | A1* | 3/2023 | Kruempelmann | G06F 16/24565 707/610 |
| 2023/0118065 | A1* | 4/2023 | Kumar | G06F 11/3684 717/124 |
| 2023/0136031 | A1* | 5/2023 | Sharma | G06F 8/60 713/1 |
| 2023/0156448 | A1* | 5/2023 | Divvi | H04W 4/90 455/404.1 |

OTHER PUBLICATIONS

Harris et al. Digital transformation at Discover using AWS Storage. AWS Storage Blog. Apr. 22, 2020, 7 pages [online], retrieved online Apr. 7, 2022]. Retrieved from the Internet <URL: https://aws.amazon.com/blogs/storage/digital-transformation-at-discover-using-aws-storage-solutions/>.

Discover Accelerates Analytics and Time-to-Insights Using AWS. Discover. 2020, 8 pages [online], [retrieved onlineApr. 7, 2022]. Retrieved from the Internet <URL: https://aws.amazon.com/solutions/case-studies/discover-financial-services-case-study/>.

Oppenheim et al. AWS re: Invent AIM 204-S. Discovering the value of a cloud data platform. 2019, 15 pages [online], retrieved online Apr. 7, 2022]. Retrieved from the Internet: <URL: https://d1.awsstatic.com/events/reinvent/2019/Discovering_the_value_of_a_cloud_data_platform_AIM204-S.pdf>.

Harris et al. Air9 Analytics Environment. Discover. 2019, 21 pages [online], [retrieved online Apr. 7, 2022]. Retrieved from the internet <URL: https://cloud.redhat.com/hubfs/Discover-OpenShift-Commons-Oct28-Final.pdf>.

* cited by examiner

Deployments > Execute

Execute Model

401 — A) Format
● Manual ○ Schedule

Execution will begin after submission

402 — B) Model Build
Name*
[Audit Model 1 ⌄]

Input Source Files

Output Destination Files

403 — C) Information
Execution Name*
[Name 1]

Description
[ ]

Notify Email ID(s)
[ ]

404 — D) Options
Instance Type*
[4X-Large (32 cores, 256GB) ⌄]

405

Config Options*
```
{
"output":"/audit/data-poc/output/",
"schema":"SCHEMA_WORKSPACE",
"input":"/audit/data-poc/input/data/abc_123.CSV",
"database":"DATABASE-1",
"outputTable":"USER1_1202",
"warehouse":"WAREHOUSE-1"
}
```

User1
- Train Models
- Manage Files
- Test Models
- Upload Data

Logout

[Cancel]  *Required Field  [Execute]

CONFIGURABLE DEPLOYMENT OF DATA SCIENCE MODELS

CROSS REFERENCE TO RELATED APPLICATIONS

This application is a continuation of and claims priority to U.S. patent application Ser. No. 17/576,588 entitled "Configurable Deployment of Data Science Models" filed on Jan. 14, 2022, which is hereby incorporated by reference in its entirety for all purposes.

BACKGROUND

An increasing number of technology areas are becoming driven by data and the analysis of such data to develop insights. One way to do this is with data science models that may be created based on historical data and then applied to new data to derive insights, such as predictions of future outcomes.

OVERVIEW

Disclosed herein is new technology that facilitates the creation and deployment of configurable data science models through the use of previously-stored, user-selectable templates and configuration parameters for the data science models.

In one aspect, the disclosed technology may take the form of a method to be carried out by a computing platform that involves (a) causing a client device associated with a user to display an interface for deploying a new data science model, wherein the interface presents the user with a list of deployment templates, and wherein each of the deployment templates comprises data specifying (i) a respective executable model package and (ii) a respective set of execution instructions for the respective executable model package, (b) receiving, from the client device, data indicating (i) a user selection of a given deployment template for use in deploying the new data science model, wherein the given deployment template comprises data specifying a given executable model package and (b) a given set of execution instructions for the given executable model package, and a given set of configuration parameters for use in deploying the new data science model, and (c) using the given executable model package, the given set of execution instructions for the given executable model package, and the given set of configuration parameters to deploy the new data science model.

In some example embodiments, the given executable model package may comprise (i) a trained model object and (ii) a pre-encoded set of pre-processing operations that are available for use with the trained model object, and the given set of execution instructions for the given executable model package may comprise instructions for (i) which one or more pre-processing operations from the pre-encoded set of pre-processing operations are to be used with the trained model object and (ii) how the one or more pre-processing operations are to be arranged.

Further, in example embodiments, the given set of configuration parameters for deploying the new data science model defines (i) an input dataset for the new data science model and (ii) an output storage location for the new data science model.

Further yet, in example embodiments, the given set of configuration parameters for deploying the new data science model further comprises a computing resource allocation to use for deploying the new data science model.

Still further, in some example embodiments, the list of deployment templates that is presented to the user is defined based on user permissions assigned to the user.

Still further, in some example embodiments, each deployment template in the list of deployment templates is stored within a database.

Still further, in some example embodiments, the method may involve, after receiving the data indicating the user selection of a given deployment template, causing the interface to present the user with an initial set of configuration parameters corresponding to the given deployment template that is editable by the user, wherein the given set of configuration parameters is defined based at least in part on the initial set of configuration parameters.

Still further, in some example embodiments, the initial set of configuration parameters corresponding to the given deployment template is stored within a database.

Still further, in some example embodiments, the method may involve tracking a deployment status of the new data science model and, while tracking the deployment status of the new data science model, generating an indication of the deployment status that is to be provided to the user.

Still further, in some example embodiments, using the given executable model package, the given set of execution instructions for the given executable model package, and the given set of configuration parameters to deploy the new data science model may involve using the given executable model package, the given set of execution instructions for the given executable model package, and the given set of configuration parameters to create an executable container comprising the new data science model and beginning to run the executable container.

In yet another aspect, disclosed herein is a computing platform that includes a network interface, at least one processor, at least one non-transitory computer-readable medium, and program instructions stored on the at least one non-transitory computer-readable medium that are executable by the at least one processor to cause the computing platform to carry out the functions disclosed herein, including but not limited to the functions of one or both of the foregoing methods.

In still another aspect, disclosed herein is a non-transitory computer-readable medium provisioned with program instructions that, when executed by at least one processor, cause a computing platform to carry out the functions disclosed herein, including but not limited to the functions of one or both of the foregoing methods.

One of ordinary skill in the art will appreciate these as well as numerous other aspects in reading the following disclosure

BRIEF DESCRIPTION OF THE DRAWINGS

FIG. 4 depicts an example of a user interface for receiving inputs related to the deployment of a configurable data science model.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Data Platform

Organizations in many different industries have begun to operate computing platforms that are configured to ingest, process, analyze, generate, store, and/or output data that is relevant to the businesses of those organizations, which are often referred to as "data platforms." For example, a financial institution may operate a data platform that is configured to ingest, process, analyze, generate, store, and/or output data related to the financial institution's customers and their financial accounts, such as financial transactions data (among other types of data that may be relevant to the financial institution's business). As another example, an organization interested in monitoring the state and/or operation of physical objects such as industrial machines, transport vehicles, and/or other Internet-of-Things (IoT) devices may operate a data platform that is configured to ingest, process, analyze, generate, store, and/or output data related to those physical objects of interest. As another example, a provider of a Software-as-a-Service (SaaS) application may operate a data platform that is configured to ingest, process, analyze, generate, store, and/or output data that is created in connection with that SaaS application. Many other examples are possible as well.

Figure 1:
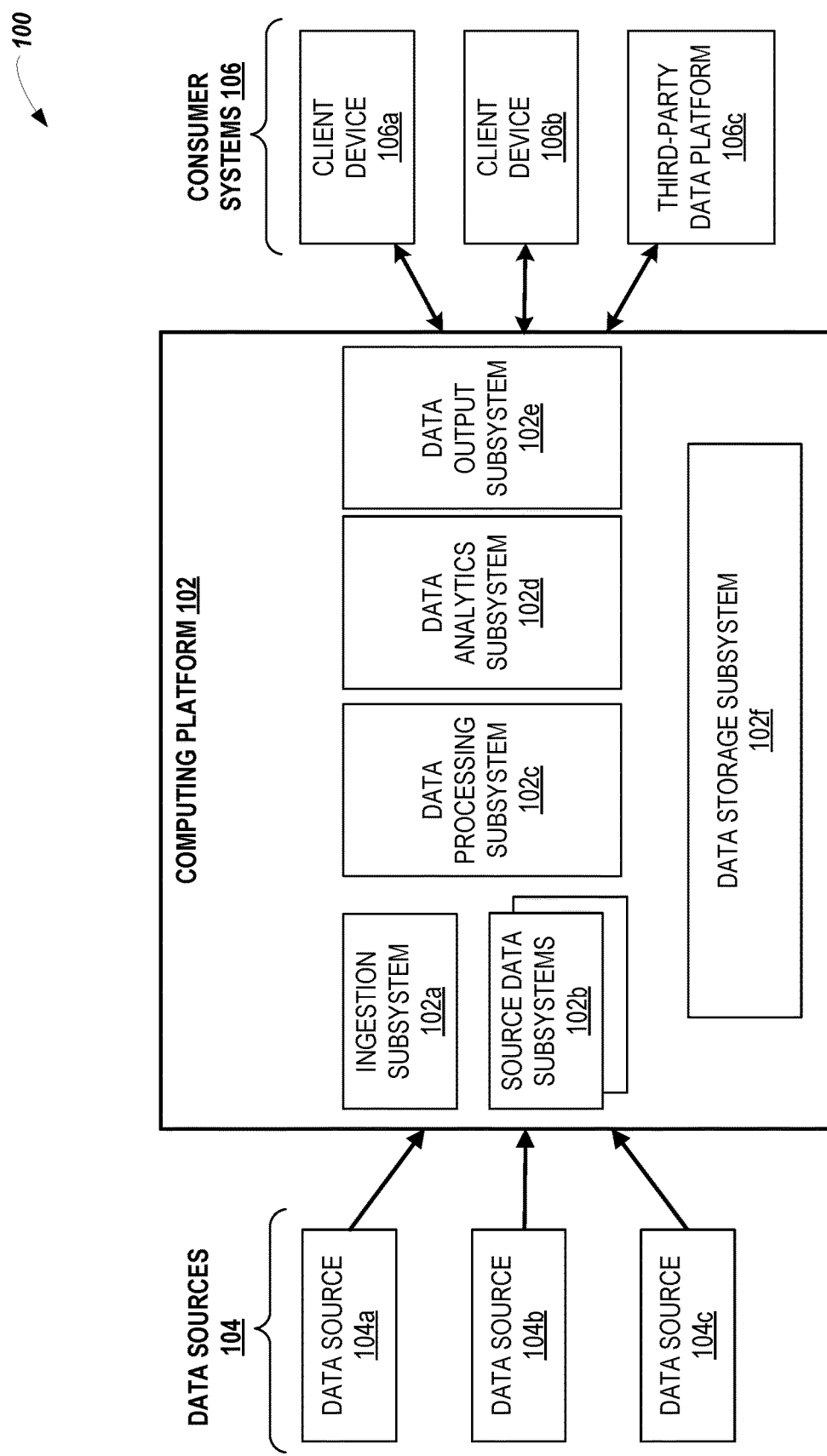
FIG. 1 is a simplified block diagram of an example network environment in which an example data platform may operate.

To illustrate with an example, FIG. 1 depicts a network environment 100 that includes at its core an example computing platform 102 that serves as a data platform for an organization, which may comprise a collection of functional subsystems that are each configured to perform certain functions in order to facilitate tasks such as data ingestion, data generation, data processing, data analytics, data storage, and/or data output. These functional subsystems may take various forms.

For instance, as shown in FIG. 1, the example computing platform 102 may comprise an ingestion subsystem 102a that is generally configured to ingest source data from a particular set of data sources 104, such as the three representative data sources 104a, 104b, and 104c shown in FIG. 1, over respective communication paths. These data sources 104 may take any of various forms, which may depend at least in part on the type of organization operating the example computing platform 102. For example, if the example computing platform 102 comprises a data platform operated by a financial institution, the data sources 104 may comprise computing devices and/or systems that generate and output data related to the financial institution's customers and their financial accounts, such as financial transactions data (e.g., purchase and/or sales data, payments data, etc.), customer identification data (e.g., name, address, social security number, etc.), customer interaction data (e.g., web-based interactions with the financial institution such as logins), and/or credit history data, among various other possibilities. In this respect, the data sources that generate and output such data may take the form of payment processors, merchant service provider systems such as payment gateways, point-of-sale (POS) terminals, automated teller machines (ATMs), computing systems at brick-and-mortar branches of the financial institution, and/or client devices of customers (e.g., personal computers, mobile phones, tablets, etc.), among various other possibilities. The data sources 104 may take various other forms as well.

Further, as shown in FIG. 1, the example computing platform 102 may comprise one or more source data subsystems 102b that are configured to internally generate and output source data that is consumed by the example computing platform 102. These source data subsystems 102b may take any of various forms, which may depend at least in part on the type of organization operating the example computing platform 102. For example, if the example computing platform 102 comprises a data platform operated by a financial institution, the one or more source data subsystems 102b may comprise functional subsystems that internally generate and output certain types of data related to customer accounts (e.g., account balance data, payment schedule data, etc.). The one or more source data subsystems 102b may take various other forms as well.

Further yet, as shown in FIG. 1, the example computing platform 102 may comprise a data processing subsystem 102c that is configured to carry out certain types of processing operations on the source data. These processing operations could take any of various forms, including but not limited to data preparation, transformation, and/or integration operations such as validation, cleansing, deduplication, filtering, aggregation, summarization, enrichment, restructuring, reformatting, translation, mapping, etc.

Still further, as shown in FIG. 1, the example computing platform 102 may comprise a data analytics subsystem 102d that is configured to carry out certain types of data analytics operations based on the processed data in order to derive insights, which may depend at least in part on the type of organization operating the example computing platform 102. For example, if the example computing platform 102 comprises a data platform operated by a financial institution, the data analytics subsystem 102d may be configured to carry out data analytics operations in order to derive certain types of insights that are relevant the financial institution's business, examples of which could include predictions of fraud or other suspicious activity on a customer's account and predictions of whether to extend credit to an existing or prospective customer, among other possibilities. The data analytics subsystem 102d may be configured to carry out any of numerous other types of data analytics operations as well.

Moreover, the data analytics operations carried out by the data analytics subsystem 102d may be embodied in any of various forms. As one possibility, a data analytics operation may be embodied in the form of a user-defined rule (or set of rules) that is applied to a particular subset of the processed data in order to derive insights from that processed data. As another possibility, a data analytics operation may be embodied in the form of a data science model that is applied to a particular subset of the processed data in order to derive insights from that processed data. In practice, such a data science model may comprise a machine learning model that has been created by applying one or more machine learning techniques to a set of training data, but data science models for performing data analytics operations could take other forms and be created in other manners as well. The data analytics operations carried out by the data analytics subsystem 102*d* may be embodied in other forms as well.

Referring again to FIG. 1, the example computing platform 102 may also comprise a data output subsystem 102*e* that is configured to output data (e.g., processed data and/or derived insights) to certain consumer systems 106 over respective communication paths. These consumer systems 106 may take any of various forms.

For instance, as one possibility, the data output subsystem 102*e* may be configured to output certain data to client devices that are running software applications for accessing and interacting with the example computing platform 102, such as the two representative client devices 106*a* and 106*b* shown in FIG. 1, each of which may take the form of a desktop computer, a laptop, a netbook, a tablet, a smartphone, or a personal digital assistant (PDA), among other possibilities. These client devices may be associated with any of various different types of users, examples of which may include individuals that work for or with the organization operating the example computing platform 102 (e.g., employees, contractors, etc.) and/or customers of the organization operating the example computing platform 102. Further, the software applications for accessing and interacting with the example computing platform 102 that run on these client devices may take any of various forms, which may depend at least in part on the type of user and the type of organization operating the example computing platform 102. As another possibility, the data output subsystem 102*e* may also be configured to output certain data to other third-party data platforms, such as the representative third-party data platform 106*c* shown in FIG. 1.

In order to facilitate this functionality for outputting data to the consumer systems 106, the data output subsystem 102*e* may comprise one or more Application Programming Interface (APIs) that can be used to interact with and output certain data to the consumer systems 106 over a data network, and perhaps also an application service subsystem that is configured to drive the software applications running on the client devices, among other possibilities.

The data output subsystem 102*e* may be configured to output data to other types of consumer systems 106 as well.

Referring once more to FIG. 1, the example computing platform 102 may also comprise a data storage subsystem 102*f* that is configured to store all of the different data within the example computing platform 102, including but not limited to the source data, the processed data, and the derived insights. In practice, this data storage subsystem 102*f* may comprise several different data stores that are configured to store different categories of data. For instance, although not shown in FIG. 1, this data storage subsystem 102*f* may comprise one set of data stores for storing source data and another set of data stores for storing processed data and derived insights. However, the data storage subsystem 102*f* may be structured in various other manners as well. Further, the data stores within the data storage subsystem 102*f* could take any of various forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, and/or streaming event queues, among other possibilities.

The example computing platform 102 may comprise various other functional subsystems and take various other forms as well.

In practice, the example computing platform 102 may generally comprise some set of physical computing resources (e.g., processors, data storage, etc.) that are utilized to implement the functional subsystems discussed herein. This set of physical computing resources take any of various forms. As one possibility, the computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the example computing platform 102 may comprise "on-premises" computing resources of the organization that operates the example computing platform 102 (e.g., organization-owned servers). As yet another possibility, the example computing platform 102 may comprise a combination of cloud computing resources and on-premises computing resources. Other implementations of the example computing platform 102 are possible as well.

Further, in practice, the functional subsystems of the example computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

As noted above, the example computing platform 102 may be configured to interact with the data sources 104 and consumer systems 106 over respective communication paths. Each of these communication paths may generally comprise one or more data networks and/or data links, which may take any of various forms. For instance, each respective communication path with the example computing platform 102 may include any one or more of point-to-point data links, Personal Area Networks (PANs), Local Area Networks (LANs), Wide Area Networks (WANs) such as the Internet or cellular networks, and/or cloud networks, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

It should be understood that network environment 100 is one example of a network environment in which a data platform may be operated, and that numerous other examples of network environments, data platforms, data sources, and consumer systems are possible as well.

As noted above, one key aspect of most data platforms today is the use of data science models to carry out data analytics and derive insights based on data that is available within the data platform. Data science models may provide certain advantages over alternate forms of data analytics such as user-defined rules. For instance, unlike most user-defined rules, data science models are created through a data-driven process that involves analyzing and learning from historical data, and as a result, data science models are capable of deriving certain types of insights from data that are simply not possible with user-defined rules—including insights that are based on data-driven predictions of outcomes, behaviors, trends, or the like and insights that can only be revealed through an understanding of complex interrelationships between multiple different data variables. Further, unlike most user-defined rules, data science models are capable of being updated improved over time through a data-driven process that re-evaluates model performance based on newly-available data and then adjusts the data science models accordingly. Further yet, data science models may be capable of deriving certain types of insights (e.g., complex insights) in a quicker and/or more efficient manner than other forms of data analytics such as user-defined rules. Depending on the nature of the available data and the types of insights that are desired, data science models may provide other advantages over alternate forms of data analytics as well.

However, before a data science model can be used by a data platform to carry out data analytics and derive insights based on data that is available within the data platform, that data science model first needs to be created and deployed. Unfortunately, such a process for creating and deploying a data science model is typically a time-consuming, complex, and labor-intensive endeavor that involves many different stages and may require collaboration and input by multiple different professionals, including data scientists, developers, engineers, and/or data analysts.

For instance, a typical process for creating and deploying a data science model may begin with a first stage during which the initial dataset that is to be used for the creation of the data science model is selected and obtained. In practice, this initial dataset could either comprise data that is already available within the data platform (e.g., source data and/or processed data), data that is ingested from other data sources, or some combination thereof.

After the initial dataset is obtained, the process may proceed to a second stage during which processing operations similar to those described above are applied to the initial dataset in order to prepare that initial dataset for further analysis and use within the model creation process. In turn, the process typically proceeds to a third stage during which exploratory data analysis (EDA) is performed by one or more data scientists or data analysts in order to gain a better understanding of the dataset. This exploratory analysis may involve various tasks, including but not limited to reviewing and visualizing the initial dataset and then performing feature engineering on the dataset in order to define which features to use for model training and what types of processing operations need to be performed on the source data in order to derive those features.

Once the features are defined, the process may proceed to a fourth stage during which the dataset is processed in order to derive one or more feature datasets that are to be used during the process of building the data science model. For example, the initial dataset may be processed in order to derive a training dataset that is used for the initial training of the data science model, a validation dataset that may be used during the course of the training process to assist with certain aspects of that process, and/or a test dataset that may be used to test and evaluate the trained data science model, among other possibilities.

Next, the process may proceed to a fifth stage during which the training dataset is used to build the data science model. At the beginning of this stage, data scientists or other professionals will select which one or more machine learning techniques are to be applied to the training dataset in order to train the data science model, and may also perform other configuration tasks such as selecting an initial set of hyperparameters for the data science model, among other possibilities. In turn, one or more machine learning techniques are applied to the training dataset in order to train the data science model. The one or more machine learning techniques that are applied could take any of various forms, examples of which may include a neural network technique (which is sometimes referred to as "deep learning"), a regression technique, a k-Nearest Neighbor (kNN) technique, a decision-tree technique, a support vector machines (SVM) technique, a Bayesian technique, an ensemble technique, a clustering technique, an association-rule-learning technique, a dimensionality reduction technique, an optimization technique such as gradient descent, a regularization technique, and/or a reinforcement technique, among other possible types of machine learning techniques. Further, in some implementations, this stage may involve training multiple different "candidate" models using different machine learning techniques and/or hyperparameters, which may then be evaluated and compared during the next stage in order to select which particular combination of machine learning technique(s) and hyperparameters are to be used for the data science model.

During the training stage, the validation dataset may also be used to assist with certain aspects of the training process for the data science model, such as selecting the hyperparameters and/or determining when to stop the training process (e.g., to avoid overfitting).

After the training stage, the process may proceed to a sixth stage during which the test dataset is used to evaluate the data science model (or the set of candidate models). This stage may involve inputting the test dataset into the one or more trained models and then evaluating and validating the performance of the one or more trained models by comparing each trained model's outputs to "ground truth" data included within the test dataset. Additionally, to the extent there are multiple candidate models that have been trained in the fifth stage, this stage may involve comparing the performance of those trained candidate models in order to select which trained candidate model to use as the data science model that is to be deployed.

Based on the evaluation performed during the sixth stage, the process may then proceed to a seventh stage during which the hyperparameters and/or features of the data science model are updated in an effort to further optimize (or at least improve) the performance of the trained data science model.

After the training and updating of the data science model has been completed, the process may optionally proceed to an eighth stage during which a data scientist or other professionals may define any additional processing operations that are to be performed on the output of the data science model in order to produce insights based on the model's output. Depending on the nature of the data science model, this stage could involve any of various tasks, including but not limited to setting a threshold that is to be applied to the model's output in order to translate that output into a Boolean data type (e.g., translating a likelihood value into a "yes" or "no" answer).

After the configuration of the data science model has been finalized, the process may proceed to a ninth stage during which the data science model is prepared and/or packaged up for deployment within the data platform. This may involve preparing and/or packaging up the trained data science model itself (which is sometimes referred to as a "model object" or a "model artifact"), configuration parameters related to the inputs and outputs of the data science model (e.g., configuration parameters that defines the specific source variables for the model, the specific feature variables for the model, the processing operations that are to be performed in order to derive the feature variables from the source variables, and any additional processing operations that are to be performed on the output of the data science model in order to produce insights based on the model's output), and any other configuration parameters that is needed to integrate the data science model into the production environment of the data platform (e.g., libraries or the like).

Once all of these steps have been completed, the data science model can then be deployed within the data platform so that it can be run on live data within the data platform, which may generally involve tasks for integrating the data science model into the production environment of the data platform. For instance, in the context of FIG. 1, the data science model may be deployed as part of the data analytics subsystem 102d of the computing platform 102. However, it should be understood that this is merely intended to serve as one illustrative example, and that the data science model could be deployed on any computing system that has sufficient computing resources to execute the data science model. Once the data science model is deployed within the data platform, it may then begin to receive input data and produce insights.

It should also be understood that the process of building a data science model could take various other forms as well—including but not limited to the possibility that certain ones of the stages discussed above could take different forms and/or take place in a different order. For example, instead of starting with one initial dataset and then using that one initial dataset to generate multiple different feature datasets during the fourth stage described above, it is possible that multiple different initial datasets could be defined and obtained as part of the first stage of the process, where each such initial dataset is then used to derive a corresponding feature dataset that is to be used for building the data science model (e.g., a first initial dataset for use in deriving a training dataset, a second initial dataset for use in deriving a validation dataset, a third initial dataset for use in deriving a test dataset, etc.). Other examples are possible as well.

Given the time-consuming, complex, and labor-intensive nature of the process for creating and deploying a data science model, there is a growing demand for software technology that can facilitate and accelerate these tasks. To address this demand, some software providers have begun to offer software applications that can assist professionals such as data scientists, developers, engineers, and/or data analysts in performing certain tasks during the process of creating and deploying a data science model. However, these software applications still have various limitations and drawbacks.

As an initial matter, the software applications that exist today are generally designed for building new data science models from the ground up. As a result, these software applications generally require data scientists and other professionals to work through all of the stages described above each time that a new data science model is to be created and deployed, providing professionals with limited or no ability to leverage their work on previous data science models in order to accelerate the process of creating and deploying a new data science model. Further, the software applications that exist today are primarily focused on the task of creating data science models and have limited or no functionality that assists with the task of deploying data science models into a production environment—let alone functionality that enables professionals to carry out this task in a quick, intuitive, or user-friendly manner. Further yet, the software applications that exist today provide professionals with limited or no ability to track and manage the deployments of their data science models that are running within a production environment.

To address these and other shortcomings associated with current solutions for creating and deploying data science models, disclosed herein is a new technology that facilitates the creation and deployment of configurable data science models through the use of predefined, user-selectable templates and corresponding configuration data, and may also facilitate monitoring of deployed data science models. This may significantly reduce the time and effort previously required for configuring and deploying data science models.

The new technology discussed herein may involve a functional subsystem that hosts a new software application for enabling users to configure and deploy data science models and also to monitor deployed data science models. This new functional subsystem may be referred to herein as a "model deployment subsystem."

In accordance with one aspect of the new software application, the model deployment subsystem may present a user (e.g., via a client device) with an interface that enables the user to select a particular deployment template from a set of available deployment templates for use in deploying a new data science model, where each deployment template specifies a predefined configuration of a data science model. Additionally, the interface may also enable the user to define certain configuration parameters for use in deploying the new data science model, such as an input data source, a desired hardware configuration for the model deployment (e.g., processor type/size, memory capacity, etc.), and an output destination, among other possibilities. The model deployment subsystem may then cause the new data science model to be deployed according to the user's inputs—which may involve interaction with one or more other functional subsystems within a data platform.

At a high level, each available deployment template may take the form of a data object (e.g., a .yaml file or blob, a .json file or blob, etc.) comprising data that specifies a predefined configuration of a data science model in terms of how a data science model should be executed (e.g., the particular configuration of the data science model's multi-stage pipeline) and perhaps also how to integrate the data science model into the production environment of the data platform. For instance, in accordance with the present disclosure, a given deployment template may comprise (i) one or more identifiers of the deployment template, (ii) data specifying a particular executable model package that forms the basis for the predefined model configuration, and (iii) data specifying a particular set of execution instructions to apply to the executable model package in order to deploy a data science model based on the executable model package, among other possible information that may be included in a deployment template. Each of these aspects of the deployment template may take any of various forms.

To begin, the one or more identifiers of the deployment template may include any identifier that could be used by the model deployment subsystem and/or the software application to identify the deployment template, which may take various forms. As one possible example, such an identifier may take the form of a name of the predefined model configuration specified by the deployment template (e.g., "Fraud Model v1," "Audit Model v1," etc.), among various other possibilities.

Further, the data within the deployment template that specifies the particular executable model package may take the form an identifier of (and/or other reference to) the executable model package, which may be stored separately from the deployment template. In accordance with the present disclosure, such an executable model package may take the form of an executable set of program logic (e.g., a container image, a .jar file, or similar executable package) that can be utilized to deploy a new data science model within a production environment.

At its core, the executable model package may include a trained model object (or sometimes referred to as a model "artifact") that was previously created through a training process for data science models (e.g., a machine learning process). The trained model object may comprise program code for carrying out the data analytics operations that will be performed to produce insights based on the data science model's input.

In addition to the trained model object, the executable model package may include a pre-encoded set of pre-processing operations that can be applied to an input dataset for the data science model in order to prepare the input dataset for input into the trained model object (e.g., by transforming the input dataset into a feature dataset). In this regard, the input dataset may comprise data for some set of input variables for the data science model, which could include either source data in its raw form that has been ingested by a data platform, source data that has undergone some initial processing at a data platform (e.g., processing applied by a data processing subsystem of the data platform), or some combination thereof.

The pre-encoded set of pre-processing operations may take various forms, including operations for translation, transformation, and/or conversion of the input dataset in order to produce the feature dataset that is input into the trained model object, once the data science model is deployed. In this regard, the pre-encoded set of pre-processing operations contained in a given executable model package may represent the set of available pre-processing operations that might, or might not, be utilized for a given deployment of the data science model. For example, one or more of the pre-processing operations in the pre-encoded set may be applicable to certain types of input data, while one or more other pre-processing operations in the pre-encoded set may be applicable to other types of input data.

Similarly, the executable model package may include a pre-encoded set of post-processing operations that can be applied to the output of the trained model object. The set of post-processing operations may take various forms, such as comparing the model object's output to a threshold value or other metric in order to produce insights, or evaluating the error rate of the model object's output, among other possibilities. Like the set of pre-processing operations, the set of post-processing operations may represent the set of available post-processing operations that might, or might not, be utilized for a given deployment of the data science model.

In this way, the executable model package may define the universe of possible operations that could be performed in a given deployment of a data science model. For instance, a given deployment of the data science model may involve a multi-stage pipeline that includes one or more pre-processing operations (which may be arranged in various manners), one or more data analytics operations performed by the trained model object, and perhaps also one or more post-processing operations. Thus, different versions of the data science model having different configurations may be deployed from the executable model package by varying the particular processing operations that are implemented and/or sequencing of these processing operations.

In turn, the data within the deployment template specifying the set of execution instructions to apply to the executable model package may comprise data specifying which of the executable model package's available pre- and post-processing operations to utilize for this predefined deployment configuration, which could include an identification of which of the available pre- and post-processing operations to utilize, an identification of which of the available pre- and post-processing operations to "skip," or some combination thereof. Additionally, the data specifying the set of execution instructions may also comprise data specifying a particular arrangement or sequencing for performing certain pre- or post-processing operations relative to one another (e.g., in series vs. in parallel), to the extent that such a relationship is not already pre-encoded within the executable model package. In this respect, the set of execution instructions specified by the deployment template may predefine a particular configuration for a data science mode in terms of a particular pipeline of operations that are to be performed by the data science model once it is deployed—which may involve a pre-processing stage, a model object stage, and perhaps also a post-processing stage, among other possibilities.

Based on the foregoing, it will be appreciated that the ability to preconfigure the pre- and post-processing stages of a given data science model, and to save those configurations as a predefined deployment template that can be selected on demand, provides users with flexibility in the configuration and deployment of data science models that can be beneficial in numerous situations. For instance, a given data science model may require a first input dataset (e.g., financial transaction data from a first country) to undergo a first set of one or more pre-processing operations to transform the data for use by the model object, whereas the same data science model may require a second input dataset (e.g., financial transaction data from a second country) to undergo a second set of one or more pre-processing operations (which differ from the first set of one or more pre-processing operations) to transform the data for use by the model object. In this situation, rather than creating two separate executable model packages that may be deployed for these two use cases, the disclosed technology makes it possible to create two deployment templates that both reference the same executable model package but have different execution instructions. Similarly, if it becomes necessary to run the same data science model on a third input dataset (e.g., financial transaction data from a third country) that requires a third set of one or more pre-processing operations to transform the data for use by the model, the disclosed technology makes it possible to only create a third deployment template that includes third set of one or more pre-processing operations, and perhaps the order for such operations, in the execution instructions for the executable model package.

In this way, the disclosed technology enables the same executable model package to be utilized for various different use cases (e.g., across different business units or teams within an organization) through the creation of different deployment templates, which improves the process of creating and deploying new data science models that utilize the same model object but have different pipeline configurations by allowing such data science models to be created and deployed in a quicker, more efficient, and less burdensome manner.

In accordance with the present disclosure, each deployment template may also be associated with a separate, predefined set of configuration parameters corresponding to the deployment template, which may serve as an initial (or "default") set of configuration parameters for the predefined model configuration specified by the deployment template, at least some of which may be edited and/or supplemented by a user as part of the process of configuring the new data science model for deployment. This initial set of configuration parameters corresponding to the deployment template may be embodied in the form of a separate data object (e.g., a database record) that is correlated to the data object comprising the deployment template in some manner, such as by including an identifier of the data object comprising the configuration parameters within the data object comprising the deployment template and/or including an identifier of the data object comprising the deployment template within the data object comprising the configuration parameters, among other possibilities.

This initial set of configuration parameters corresponding to the deployment template may take various forms, which may depend on the requirements of the trained model object, among other factors. For instance, the initial set of configuration parameters may include a specification of the particular data within the platform that is to serve as an input dataset for the data science model (e.g., an identifier of a configuration file such as a .csv file that defines the particular input data variables for which data is to be obtained), a default computing resource allocation (e.g., processor/memory size and/or configuration) to be used for running the data science model, a specification of one or more storage locations that are to serve as the destination(s) for writing the output of the data science model (e.g., an identification of one or more particular data stores where the output is to be written), a schema for the output of the data science model, and perhaps other configuration parameters that can be utilized to integrate a deployed data science model into the computing platform (e.g., configuration parameters for network connectivity and/or configuration parameters for interacting with other functional subsystems within the computing platform), among numerous other possibilities.

As noted, at least some of the configuration parameters in the initial set of configuration parameters corresponding to a selected deployment template may also be edited by a user via the interface presented by the disclosed software application. For instance, within the context of a given deployment template, a user may edit the input dataset that is to be provided to the data science model (e.g., by specifying a different set of input variables and/or a different set of one or more data stores from which the input dataset is to be retrieved) and/or the output destination where the output of the data science model is to be written (e.g., by specifying a different set of one or more data stores where the output is to be written). As another possibility, the initial set of configuration parameters may indicate a default computing resource allocation (e.g., size and/or configuration of processor, memory, etc.) that is to be utilized for deployment of the data science model, whereas the user may select a different computing resource allocation. (It should also be understood that, in some embodiments, the initial set of configuration parameters may only indicate a set of possible computing resource allocation options that are available for deployment of the data science model without indicating one default computing resource allocation, in which case the user may then select the computing resource allocation from the set of options). As yet another possibility, the initial set of configuration parameters may indicate that the data science model should execute based on a manual user command, whereas the user may edit the configuration such that the data science model runs on a defined schedule (e.g., daily, weekly, etc.). Other aspects of the initial set of configuration parameters may be user-editable as well. This aspect of the disclosed technology also improves the process of creating and deploying new data science models by allowing the deployment configuration of such data science models within the production environment to be defined in a quicker, more efficient, and less burdensome manner.

In accordance with the present disclosure, any of several different approaches may be utilized for maintaining the deployment templates and corresponding sets of configuration parameters. According to one such approach, the deployment templates may be maintained together with the back-end code for the disclosed software application in a code repository (e.g., a Git repository or the like), while the respective set of configuration parameters corresponding to each deployment template may be stored in a database (e.g., a relational or NoSQL database) that is accessible by the model deployment subsystem. For instance, the respective sets of configuration parameters may be organized in a database along with identifiers that each indicate the particular deployment template to which the respective set of configuration parameters corresponds. Storing the configuration parameters in this way may allow it to be updated independently from the deployment templates and the back-end code of the disclosed software application, which may facilitate more streamlined updates to the initial set of configuration parameters for a given deployment template, as necessary.

According to another such approach, the deployment templates and the respective sets of configuration parameters corresponding to deployment templates may both be stored in a database (e.g., a relational or NoSQL database) that is accessible by the model deployment subsystem, where the deployment templates and configuration parameters could be stored in the same database or different databases. In this respect, the deployment templates may be embodied in a format that is suitable for storage in a database, such as .yaml or .json files or blobs, among other possibilities. Similar to the benefits noted above with respect to configuration parameters, storing the deployment templates in a database as opposed to the code repository for the back-end code of the disclosed software application may facilitate more streamlined updates to the deployment templates. For instance, when the deployment templates are stored in conjunction with the back-end code of the disclosed software application, it may require a user to rebuild the executable file(s) that comprise the software application whenever a deployment template needs to be updated or added to the set of available deployment templates. This can be time consuming and burdensome in some situations, such as in an enterprise environment, where any code changes generally need to undergo a multi-step process that involves testing and validation before they are implemented. On the other hand, updating a database to store updated or additional deployment templates that are then accessible by the back-end code of the disclosed software application is likely to be less time consuming and burdensome than this process.

Other approaches for maintaining the deployment templates and corresponding configuration parameters may be possible as well.

In turn, the executable model packages may be maintained in a repository configured for storage of executable packages (e.g., a container registry), referred to herein as an "model repository," which is separate from the repositories where the deployment templates and configuration parameters are maintained. In the examples discussed herein, the model repository is generally accessed by the model deployment subsystem at the time of deployment, when the executable model package referenced by the selected deployment template is retrieved as part of deployment. Similar to the deployment templates and the configuration parameters, storage of the executable model packages in a separate repository in this way may allow for executable model packages to be added to or removed from the repository relatively easily (e.g., upon the training of a new model object, retiring of a prior model object, or changing the set of available processing operations). In other examples, the executable model packages may be stored in other arrangements with respect to the deployment templates and configuration parameters.

Figure 2:
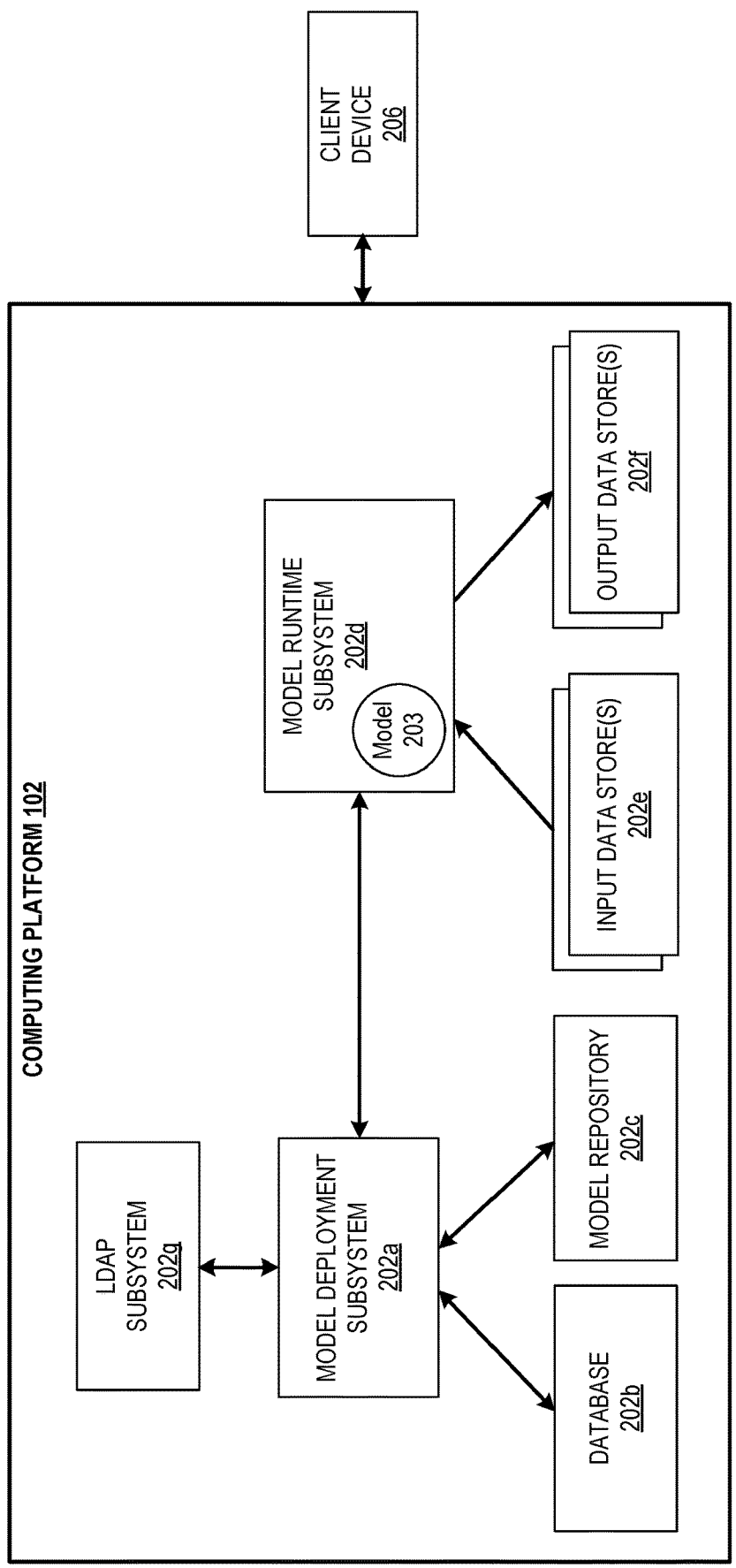
FIG. 2 depicts a simplified block diagram of example subsystems of a data platform that may facilitate the deployment of a configurable data science model.

Turning now to FIG. 2, a block diagram is shown to illustrate various functional subsystems of a computing platform, such as the computing platform 102 of FIG. 1, that are each configured to perform certain operations to facilitate the configuration and deployment of data science models in accordance with the disclosed technology. For instance, as shown in FIG. 2, the computing platform 102 may include a model deployment subsystem 202a, a database 202b, a model repository 202c, a model runtime subsystem 202d, one or more input data stores 202e, one or more output data stores 202f, and a lightweight directory access protocol (LDAP) subsystem 202g, among other possibilities. In practice, it should be understood that some of the functional subsystems shown in FIG. 2 could be subsystems of the higher-level functional subsystems described and shown with reference to FIG. 1, while other of the functional subsystems shown in FIG. 2 could be separate from those higher-level functional subsystems. For example, the model deployment subsystem 202a and/or the model runtime subsystem 202d may be subsystems of the data analytics subsystem 102d of FIG. 1, and the database 202b, the model repository 202c, the one or more input data stores 202e, and the one or more output data stores 202f may be considered subsystems of the data storage subsystem 102f, while the LDAP subsystem 202g may be separate from the functional subsystems of FIG. 1. Other configurations are also possible.

In accordance with the present disclosure, the model deployment subsystem 202a may host a new software application for deploying data science models and monitoring deployed data science models that may be accessible by a user via a client device, such as client device 206 shown in FIG. 2, which may be similar to one of the client devices 106a or 106b shown in FIG. 1. For instance, the disclosed software application may take the form of a web-based application that a user may access via a web browser on client device 206 or a mobile application that a user may launch on client device 206. Other implementations for the disclosed software application are also possible.

While hosting and running the disclosed software application, the model deployment subsystem 202a may carry out various functions related to the configuration and deployment of data science models, as well as the monitoring of deployed data science models. These functions may take various forms.

To begin, the model deployment subsystem 202a may function to provide an interface (e.g., a graphical user interface) that allows a user to make selections and configure certain aspects of a new data science model for deployment. An example of such an interface that may be provided by the model deployment subsystem 202a is discussed below in connection with FIG. 4. In practice, a user may request access to this interface by logging in to the disclosed software application via the client device 206, and in response to determining that the user has been authenticated, the model deployment subsystem 202a may cause the client device 206 to present the interface for configuring and deploying a new data science model.

Additionally, the model deployment subsystem 202a may carry out various other functions that enable the user to configure and deploy a new data science model via the interface, which may make use of various services and associated APIs that are supported by model deployment subsystem 202a. In practice, these APIs could be external APIs that are exposed publicly, in which case the calls to such APIs may originate from external entities as the client device 206, or could be internal APIs that facilitate internal communication between different functional components of the model deployment subsystem 202a, in which case the calls to such APIs may originate from another functional component of the model deployment subsystem 202a.

As one possibility, after receiving a request by a user to access the software application, the model deployment subsystem 202a may function to retrieve a list of deployment templates that are available for selection by the user and then cause the list of deployment templates to be presented to the user in a selectable manner via the interface. This function may take various forms. For example, in at least some implementations, this function may involve calling an API of a first service supported by the model deployment subsystem 202a that is tasked with retrieving a list of deployment templates that are available for selection by a user. In this respect, the first service may function to retrieve a global list of available deployment templates in some manner (which may depend on whether the deployment templates are maintained within the code repository or the database 202b), and may also function to filter the global list of available deployment templates based on permissions information for the user (which may involve interaction with the LDAP subsystem 202g). Other examples are possible as well.

As another possibility, along with retrieving the list of deployment templates that are available for selection by the user, the model deployment subsystem 202a may function to retrieve an initial set of configuration parameters corresponding to each available deployment template and make it available for presentation to the user such that, when the user selects a particular deployment template via the interface, the initial set of configuration parameters corresponding to that selected deployment template may be loaded and presented to the user via the interface. This function may take various forms, which may depend in part on whether the deployment templates are maintained in the code repository or a database. For example, in implementations where the deployment templates are stored in a database (e.g., the database 202b), this function may be carried out by the same service that is tasked with retrieving the list of deployment templates that are available for selection by a user. In this respect, the first service may additionally function to access the database where the initial sets of configuration parameters are stored to retrieve an initial set of configuration parameters corresponding to each available deployment template and make it available for presentation to the user along with the list of available deployment templates. Other examples are possible as well.

As yet another possibility, the model deployment subsystem 202a may function to receive an indication that a user has requested deployment of a data science model based on a given deployment template (e.g., the deployment template that was selected by the user via the interface) and a given set of configuration parameters (e.g., an edited version of the initial set of configuration parameters that is received from the client device 206) and then retrieve the given deployment template along with any additional configuration parameters for use in deploying the data science model (e.g., configuration parameters beyond those included in the communication sent by the client device 206). This function may take various forms. For instance, in at least some implementations, this function may involve calling an API of a second service supported by the model deployment subsystem 202a that is tasked with retrieving a selected deployment template in some manner (which may depend on whether the deployment templates are maintained within the code repository or the database 202b) and also retrieving any additional configuration parameters for use in deploying the data science model (e.g., from the database 202b), which may then be included as part of the given set of configuration parameters. Other examples are possible as well. Other examples are possible as well.

As still another possibility, the model deployment subsystem 202a may function to deploy a data science model based on a deployment template and a set of configuration parameters. This function may take various forms. As one example, this function may involve calling an API of a third service supported by the model deployment subsystem 202a that is tasked with obtaining an executable model package referenced in a deployment template and then using the executable model package, the execution instructions included within the deployment template, and the set of configuration parameters to deploy the data science model. In this respect, the third service may function to receive the deployment template and the configuration parameters from the second service, access a model repository (e.g., the model repository 202c) to obtain the executable model package, apply the execution instructions within the deployment template and the configuration parameters to that the executable model package in order to create a deployed data science model that can be executed by the model runtime subsystem 202d (e.g., an executable container or virtual machine comprising the data science model), and perhaps also provision computing resources within the model runtime subsystem 202d according to the configuration parameters. Further, the third service may store metadata for the deployment in a database (e.g., the database 202b). Other examples are possible as well.

Additionally yet, the model deployment subsystem 202a may carry out various functions that enable the user to monitor a deployed data science model, which may also make use of various services and associated APIs that are supported by model deployment subsystem 202a. As noted above, in practice, these APIs could be external APIs that are exposed publicly, in which case the calls to such APIs may originate from external entities as the client device 206, or could be internal APIs that facilitate internal communication between different functional components of the model deployment subsystem 202a, in which case the calls to such APIs may originate from another functional component of the model deployment subsystem 202a.

As one possibility, the model deployment subsystem 202a may function to track the status of a deployed data science model and then provide status updates to a user. This function may take various forms. As one example, this function may involve calling an API of a fourth service supported by the model deployment subsystem 202a that is tasked with tracking status of each deployed data science model and then causing status updates to be provided to certain users (e.g., the user that requested deployment of a data science model and perhaps also other users that have been subscribed to status updates for a data science model). In this respect, the fourth service may function to interact with the model runtime subsystem 202d to obtain status information for a deployed data science model, store the status information in a database (e.g., the database 202b), and then use this status information as a basis for generating status updates that are to be provided to users (e.g., by issuing emails or text messages or surfacing notifications within the software application). Such status information may take various forms, examples of which may include (i) information regarding the execution of a data science model, such as the data science model's runtime, CPU and/or RAM usage, and/or (ii) information regarding the performance of a data science model, such as whether the data science model is generating output data that is within expectations.

The model deployment subsystem 202a may take various other forms and perform various other functions as well.

The database 202b of FIG. 2 may be configured to store certain information that facilitates the configuration, deployment, and tracking of data science models. For instance, in line with the discussion above, the database 202b may contain configuration parameters corresponding to each of the deployment templates, as discussed above. Further, in at least some implementations, the database 202b may contain the deployment templates themselves. Further yet, the database 202b may contain metadata for deployments of data science models, which may be written to the database 202b by the model deployment subsystem 202a as part of the process of deploying data science models. Still further, the database 202b may contain status information related to data science models that are currently deployed within the model runtime subsystem 202d, which may be written to the database 202b by the model deployment subsystem 202a and/or some other functional subsystem of the computing platform 102 (e.g., the model runtime subsystem 202d). The database 202b of FIG. 2 may contain other information as well.

The model repository 202c of FIG. 2 may be configured to store the executable model packages referenced by the deployment templates, which as noted above could take various forms, examples of which may include container images and/or .jar files, among other possibilities. The model repository 202c may store other data objects as well.

The model runtime subsystem 202d of FIG. 2 may be configured to execute the data science models that have been configured and deployed in the manner disclosed herein. In this respect, the model runtime subsystem 202d could take the form of a runtime environment for containers (e.g., Kubernetes or Docker containers), among various other possibilities. To illustrate with an example, a deployed data science model 203 is shown to be executing within the model runtime subsystem 202d. While FIG. 2 shows one deployed data science model 203, it will be understood that, in practice, the model runtime subsystem 202d may simultaneously be executing multiple different data science models that might have been deployed by a given user, or by multiple different users.

FIG. 2 further shows one or more input data stores 202e, which may serve as the source of the input dataset for the deployed data science model 203 within the model runtime subsystem 202d. The input data stores 202e may take various forms, including any one or more of the data store types discussed above with respect to the data storage subsystem 102f, among other possibilities. Further, the input dataset obtained from the one or more input data stores 202e may take any of various forms, which may depend at least in part on the type of organization operating the computing platform 102 and the type of data science model that has been deployed. For example, if the computing platform 102 is operated by a financial institution and the deployed data science model is configured to identify fraud or other suspicious activity, the input dataset obtained from the one or more input data stores 202e may contain customer transaction or financial account activity data. Various other data types, from various other sources of input data for the data science model, are also possible—including but not limited to the possibility that input data for the data science model is obtained from other functional subsystems of the computing platform 102 (e.g., the ingestion or processing subsystem).

In turn, FIG. 2 shows one or more output data stores 202f, which may serve as the destination of the data that is output by the deployed data science model. Like the one or more input data stores 202e, the one or more output data stores 202f may include any one or more of the data store types discussed above with respect to the data storage subsystem 102f. Further, it should be understood that a given data science model may be configured (e.g., via a deployment template and/or associated configuration parameters) to output data to multiple different output data stores 202f. For instance, a given data science model may be configured to write the same output data to both a short-term data store (e.g., a data warehouse such as Snowflake) for more immediate use, as well as a long-term data store (e.g., an object-based data store such as Amazon S3), where it may be maintained for a predetermined period of time (e.g., for audit purposes). In conjunction with this functionality, the given data science model could also be configured to write metadata for the output data to yet another data store. Many other examples are also possible.

FIG. 2 also shows that the computing platform 102 may include an LDAP subsystem 202g, or a similar directory access subsystem, that stores information related to users of the computing platform 102. For example, the LDAP subsystem 202g may include user information that facilitates authentication operations for users, such as username and password information. As another example, the LDAP subsystem 202g may include permission information that facilitates authorization operations for users. This permission information may take various forms and may generally relate to the user's role within an organization. For instance, the user may belong to a given organizational department, which may permit them to access data associated with that department (e.g., via a set of user permissions), whereas the user may be restricted from accessing data associated with other departments. Similarly, the user may be associated with a given user type (e.g., administrator, manager, etc.) which may permit them to access corresponding data types, but not others. The LDAP subsystem 202g may store other information as well.

Various other functional subsystems of the computing platform 102 may then interact with the LDAP subsystem 202g in order to perform authentication and/or authorization operations. For instance, as shown in FIG. 2, the model deployment subsystem 202a may interact with the LDAP subsystem 202g in order to authenticate a user's login to the software application hosted by the model deployment subsystem 202a and/or determine which deployment templates and corresponding information are authorized for access by the user (e.g., based on the user's assigned role) and can be presented to the user via the disclosed software application.

Figure 3:
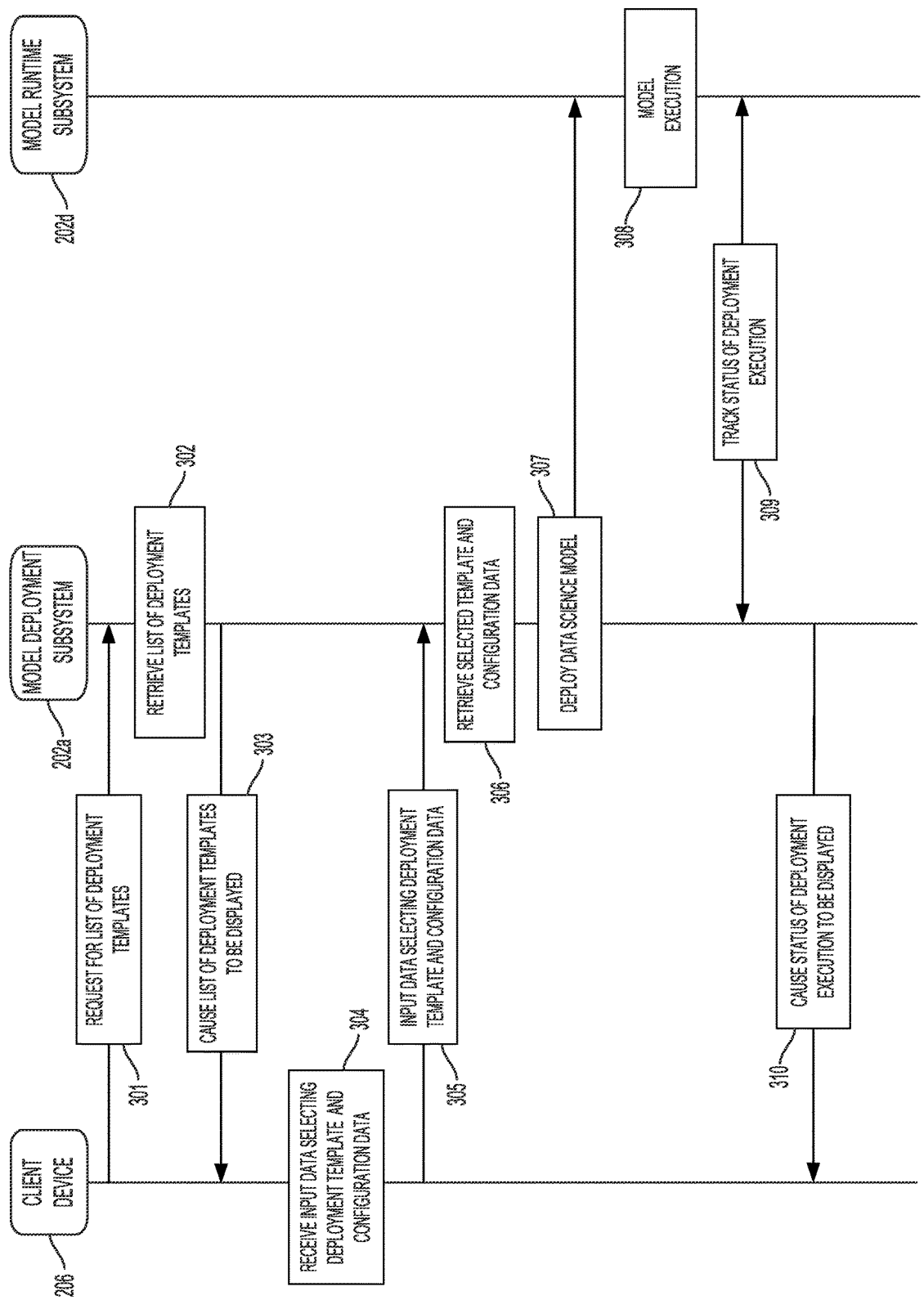
FIG. 3 depicts an example communication diagram for facilitating the deployment of a configurable data science model.

Turning now to FIG. 3, an example communication diagram is provided to illustrate communications that may be exchanged, and operations that may be performed, by some of the subsystems in FIG. 2 to configure and deploy a new data science model. In particular, FIG. 3 illustrates example interactions involving the client device 206, the model deployment subsystem 202a, and the model runtime subsystem 202d. Further, the example interactions may take place within the context of the overall computing platform 102 shown in FIG. 1.

In the example of FIG. 3, a user may use client device 206 to access the software application hosted by the model deployment subsystem 202a, which may take the form of a web-based application or mobile application, among other possibilities. As an initial step, the user may enter access credentials (e.g., a username and password) for logging in to the software application. In response, the model deployment subsystem 202a may query the LDAP subsystem 202g shown in FIG. 2, to authenticate the login request. As part of a successful authentication, the model deployment subsystem 202a may also receive, from the LDAP subsystem 202g, a set of permissions information for the user that governs the user's ability to access certain data within the computing platform 102.

At block 301 of the example communication diagram shown in FIG. 3, following a successful login to the software application, the client device 206 may transmit a communication to the model deployment subsystem 202a comprising a request for a list of the deployment templates (and corresponding sets of configuration parameters) that are available to the user. In some implementations, the client device 206 may transmit the request immediately upon receiving an indication of a successful login. Alternatively, the client device 206 might transmit the request after a user navigates to an interface for configuring a new data science model. Other examples are possible as well.

At block 302, after receiving the communication sent by the client device 206 at block 301, the model deployment subsystem 202a may retrieve a list of the deployment templates (and corresponding sets of configuration parameters) that are available to the user. This function of retrieving the deployment templates make take various forms. For instance, in at least some implementations, this function may involve calling an API of a first service supported by the model deployment subsystem 202a that is tasked with retrieving a list of deployment templates that are available for selection by a user. In this respect, the first service may function to retrieve a global list of available deployment templates in some manner (which may depend on whether the deployment templates are maintained within the code repository or the database 202b), and may also function to filter the global list of available deployment templates based on permissions information for the user that is received form the LDAP subsystem 202g. Additionally, as noted above, the first service may also function to retrieve an initial set of configuration parameters corresponding to each available deployment template (e.g., from the database 202b) and make it available for presentation via the interface such that, when the user selects a particular deployment template via the interface, the initial set of configuration parameters corresponding to that selected deployment template may be loaded and presented to the user via the interface. Other examples are possible as well.

Further, in line with the discussion above, the communication sent by the client device 206 at block 301 may itself take the form of an API call that triggers the first service of the model deployment subsystem 202a to be invoked, or alternatively, the communication sent by the client device 206 may trigger the model deployment subsystem 202*a* to make a call to an internal API of the first service in order to invoke the first service. Other arrangements are also possible.

Further yet, although the example shown in FIG. 3 illustrates the model deployment subsystem 202*a* retrieving the available deployment templates based on a request received from the client device 206, other implementations are also possible. For instance, the model deployment subsystem 202*a* might retrieve this information automatically after a successful user login, without receiving a request to do so from the client device 206. Other examples are also possible.

At block 303, the model deployment subsystem 202*a* may cause the list of deployment templates to be displayed by the client device 206 along with an initial set of configuration parameters for a selected one of the deployment templates. As discussed above, the software application hosted by the model deployment subsystem 202*a* may provide a graphical user interface that is viewable via the client device 206 and presents the list of deployment templates in such a way that the user can select from the various different options. For instance, different deployment templates may be displayed in a selectable list or a drop-down menu, among other possibilities. Further, as noted above, selection of a given deployment template may cause the interface to load and present an initial set of configuration parameters that corresponds to the selected deployment template.

One possible example of the interface provided by the software application can be seen in FIG. 4, which illustrates a dashboard 400 that may be displayed by the client device 206. As shown in FIG. 4, the dashboard 400 displays a series of columns that include selectable options. In the first column 401, a set of options is included whereby the user may select when and how often the data science model should be executed after deployment. For instance, the dashboard 400 indicates that the data science model should be run manually, which may be an initial setting included in the initial set of configuration parameters that is associated with the selected deployment template. As noted above, the user may edit this initial configuration parameter, such as by selecting and defining a scheduled execution (e.g., daily, weekly, etc.) for the data science model.

In a second column 402 of dashboard 400, the list of deployment templates can be displayed, as depicted in FIG. 4 as a drop-down menu, and any of the deployment templates in this list can be selected by the user. For instance, as can be seen in FIG. 4, the user has selected a deployment templated named "Audit Model 1." As can also be seen in FIG. 4, the selection of the deployment template named "Audit Model 1" has caused the first column 401 and the fourth column 404 (discussed below) to be loaded with an initial set of configuration parameters that corresponds to the selected deployment template. If the user were to select a different deployment template from the drop-down menu, some or all of the data shown in the first column 401 or the fourth column 404 may be updated to display a different initial set of configuration parameters that corresponds to the different deployment template. Further, as noted above, the deployment templates that are included in the list and therefore selectable within the dashboard 400 may be dictated by the user's associated access permissions. For instance, the user may be associated with the audit department of an organization and thus is able to view audit-related deployment templates but is unable to view deployment templates that are related to a different department (e.g., marketing-related deployment templates).

In the third column 403, the dashboard 400 includes several fields in which the user may input additional information about the deployed data science model, such as an execution name, description, and any email IDs for users that are to receive notifications about the data science model after it is deployed. The additional information that is entered by the user into these fields may form the basis for the metadata that is later stored for the deployed data science model.

Turning to the fourth column 404, the dashboard 400 includes a drop-down menu for presenting a list of computing resource options that may be selected for the deployment template "Audit Model 1." For instance, a selection of a computing resource option that comprises 32 CPU cores and 256 GB of RAM is shown in FIG. 4, which may be populated based on the initial set of configuration parameters corresponding to the selected deployment template. As noted above, the list of computing resource options and/or the particular computing resource option that is selected by default may change based on selection of a different deployment template.

The fourth column of dashboard 400 also includes, within a configuration field 405, configuration information for the input source(s) and output destination(s) for the data science model, which may initially be populated based on the initial set of configuration parameters and may thereafter be edited by the user. For instance, configuration field 405 is shown to include an identifier of a file that defines an input dataset for the data science model (i.e., the file "abc_123.csv"), an output path for the data science model along with other parameters that define the output destination of the data science model, and other parameters that define the output destination of the data science model.

Various other information may also be displayed in the dashboard 400 shown in FIG. 4, including other types of editable configuration parameters that correspond to a given deployment template.

Returning to FIG. 3, at block 304, the client device 206 may receive user input that serves to select a given deployment template and define a given set of configuration parameters for use in deploying the new data science model. Further, the user input may involve a request to deploy the data science model. In this regard, the request to deploy the data science model may serve as a confirmation of the user's other inputs as shown in FIG. 4, such as a selection of an "Execute" button in the dashboard 400.

At block 305, the client device 206 may transmit a communication to the model deployment subsystem 202*a* that comprises an indication of the user's request to deploy the data science model, along with data indicating (i) the given deployment template selected by the user and (ii) the given set of configuration parameters defined by the user.

At block 306, based on receiving the communication sent by the client device 206 at block 305, the model deployment subsystem 202*a* may retrieve the given deployment template (e.g., the "Audit Model 1" template) along any additional configuration parameters for use in deploying the data science model (e.g., configuration parameters beyond those included in the communication sent by the client device 206). This function may take various forms. For instance, in at least some implementations, this function may involve calling an API of a second service supported by the model deployment subsystem 202*a* that is tasked with retrieving a selected deployment template in some manner (which may depend on whether the deployment templates are maintained within the code repository or the database 202b) and also retrieving any additional configuration parameters for use in deploying the data science model (e.g., from the database 202b), which may then be included as part of the given set of configuration parameters for the deployment of the new data science model. Other examples are possible as well.

Further, in line with the discussion above, the communication sent by the client device 206 at block 306 may itself take the form of an API call that triggers the second service of the model deployment subsystem 202a to be invoked, or alternatively, the communication sent by the client device 206 may trigger the model deployment subsystem 202a to make a call to an internal API of the second service in order to invoke the second service. Other arrangements are also possible.

At block 307, the model deployment subsystem 202a may deploy the data science model based on the given deployment template and the given set of configuration parameters. This function may take various forms. For instance, in some implementations, this function may involve calling an API of a third service supported by the model deployment subsystem 202a that is tasked with obtaining an executable model package specified by a deployment template and then using the executable model package, a pre-encoded set of execution instructions specified by the deployment template, and the given set of configuration parameters to deploy the data science model.

In this respect, the third service may function to receive the given deployment template and the given set of configuration parameters from the second service, retrieve the executable model package (e.g., from the model repository 202c), apply the pre-encoded set of execution instructions specified by the given deployment template and the given set of configuration parameters to that the executable model package in order to create a deployed data science model that can be executed by the model runtime subsystem 202d (e.g., an executable container or virtual machine comprising the data science model), and then provision the model runtime subsystem 202d to execute the deployed data science model using a particular computing resource allocation (e.g., 32 CPU cores and 256 GB of RAM). Further, as part of deploying the data science model, the third service may carry out functions for integrating the data science model's input and output with the other functional subsystems of the computing platform 102 (e.g., by interconnecting the input of the data science model with the input data store(s) and the output of the data science model with the output data store(s)). Further yet, the third service may store metadata for the deployment in a database (e.g., the database 202b), such as a name of the deployment, a description of the deployment, and/or identification information for users that are to be notified about deployment status. Other examples are possible as well.

At block 308, the deployed data science model may begin executing within the model runtime subsystem 202d. For example, if the deployed data science model comprises an executable container that is created at block 307, then the model runtime subsystem 202d may begin to run the executable container at block 308. In this respect, the deployed data science model could begin executing within the model runtime subsystem 202d upon deployment, or could be executed according to a given schedule (e.g., periodically), among other possibilities.

At block 309, after the data science model begins executing within the model runtime subsystem 202d, the model deployment subsystem 202a may also begin tracking the status of the deployed data science model. This function may take various forms. For instance, in at least some implementations, this function may involve calling an API of a fourth service supported by the model deployment subsystem 202a that is tasked with tracking status of each deployed data science model. In this respect, the fourth service may function to interact with the model runtime subsystem 202d to obtain status information for a deployed data science model and then store the status information in a database (e.g., the database 202b). As noted above, such status information may take various forms.

As one example, the status of the deployed data science model may be expressed in terms of execution status information, such as its runtime, CPU usage, RAM usage, whether any computational errors have occurred (e.g., logging errors), etc. Further, this type of execution status information could be tracked at each stage of the data science model's multi-stage pipeline, such that a user may separately assess the model's execution status during pre-processing operations, during data analytics operations performed by the trained model object, and during post-processing operations, among other possibilities.

As another example, the status of the deployed data science model may be expressed in terms of performance status information, such as an indication of the data science model's performance against one or more criteria that may define boundaries within which the trained model object is expected to produce outcomes. For instance, an example data science model that is trained to identify fraudulent financial transactions within an input data set may be expected to identify, based on historical data, an upper bound of 5% of the transactions within the data set as fraudulent. Thus, if the data science model identifies 90% of the transactions as fraudulent, the model deployment subsystem 202a may flag the data science model as potentially having a performance issue. This, in turn, may alert a user that the data science model may need to be reviewed and possibly reconfigured.

Additionally, while tracking the status of the deployed data science model, the model deployment subsystem 202a may cause status updates for the deployed data science model to be provided to certain users (e.g., the user that initiated deployment of a data science model and perhaps also other users that have been subscribed to status updates for a data science model). This function may take various forms. For instance, in at least some implementations, the fourth service that is tasked with tracking the status of each deployed data science model may additionally use the obtained status information for a deployed data science model as a basis for causing status updates to be provided to users.

In accordance with this functionality, at block 310, the model deployment subsystem 202a may cause an indication of the deployed data science model's status to be provided to the user that initiated the deployment of the data science model (and perhaps also other users that have been subscribed to status updates for the deployed data science model). This function may take vvarious forms. For instance, as one possibility, the model deployment subsystem 202a may cause an indication of the deployed data science model's status to be presented via an interface of the disclosed software application (e.g., on a deployment status screen). As another possibility, the model deployment subsystem 202a may communicate with a simple mail transfer protocol (SMTP) subsystem of the computing platform 102 to send an email comprising an indication of the deployed data science model's status to the user at client device 206. As yet another possibility, the model deployment subsystem 202a may communicate with a short message service (SMS) subsystem to send a text message comprising an indication of the deployed data science model's status to the user at client device 206. Other examples are also possible.

The functions that may be carried out by the model deployment subsystem 202a, the client device 206, and/or the model runtime subsystem 202d in order to configure, deploy, and track data science models in accordance with the disclosed technology may take various other forms as well.

Figure 5:
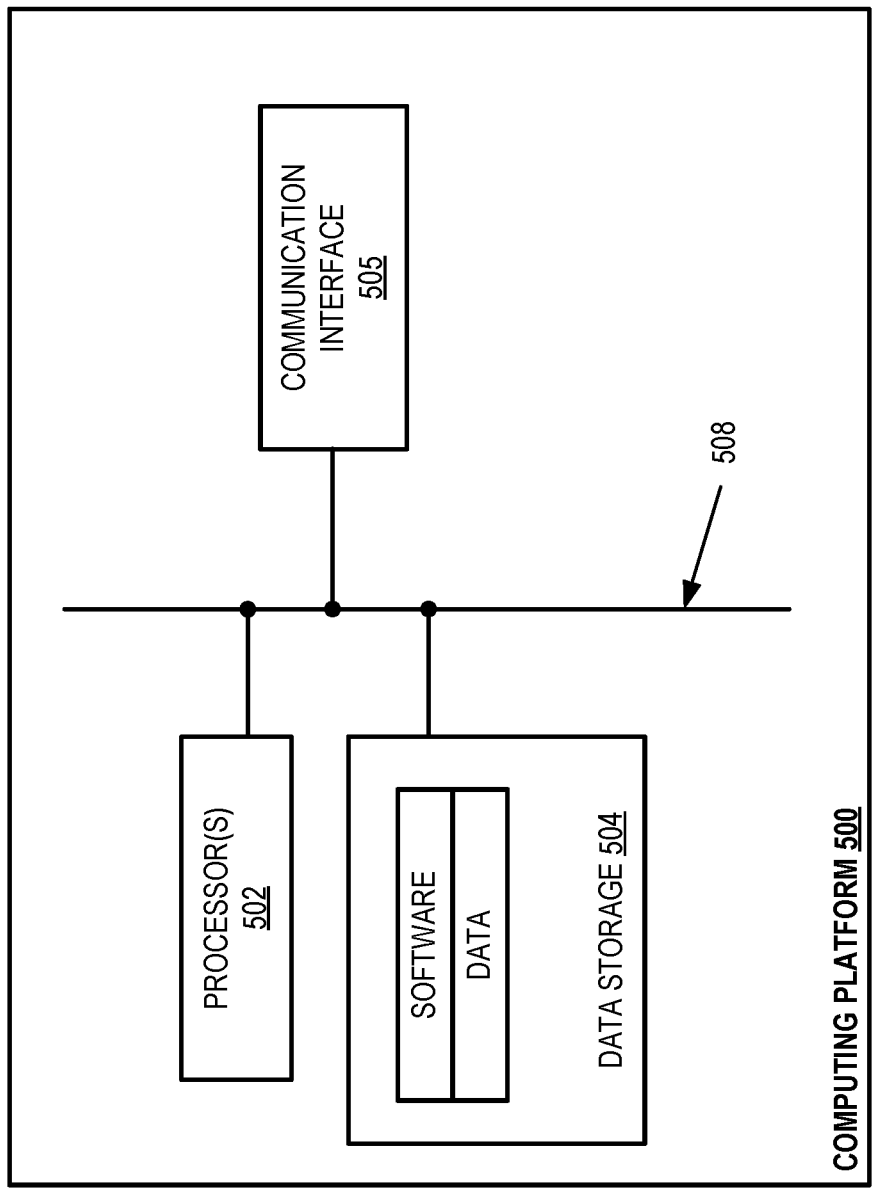
FIG. 5 is a simplified block diagram that illustrates some structural components that may be included in an example data platform.

Turning now to FIG. 5, a simplified block diagram is provided to illustrate some structural components that may be included in an example computing platform 500. For example, computing platform 500 could serve as the computing platform 102 shown in FIG. 1 and may be configured to carry out any of the various subsystem functions disclosed herein—including but not limited to the functions performed by the software application 202a in the example communication diagram described with reference to FIG. 3. At a high level, computing platform 500 may generally comprise any one or more computer systems (e.g., one or more servers) that collectively include at least a processor 502, data storage 504, and a communication interface 506, all of which may be communicatively linked by a communication link 508 that may take the form of a system bus, a communication network such as a public, private, or hybrid cloud, or some other connection mechanism. Each of these components may take various forms.

For instance, processor 502 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 502 could comprise processing components that are distributed across a plurality of physical computing devices connected via a network, such as a computing cluster of a public, private, or hybrid cloud.

In turn, data storage 504 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 504 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 5, data storage 504 may be capable of storing both (i) program instructions that are executable by processor 502 such that the computing platform 500 is configured to perform any of the various functions disclosed herein (including but not limited to any the functions performed by the software application 202a described with reference to FIG. 3), and (ii) data that may be received, derived, or otherwise stored by computing platform 500.

Communication interface 506 may take the form of any one or more interfaces that facilitate communication between computing platform 500 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

It should be understood that computing platform 500 is one example of a computing platform that may be used with the embodiments described herein. Numerous other arrangements are possible and contemplated herein. For instance, other computing systems may include additional components not pictured and/or more or less of the pictured components.

Figure 6:
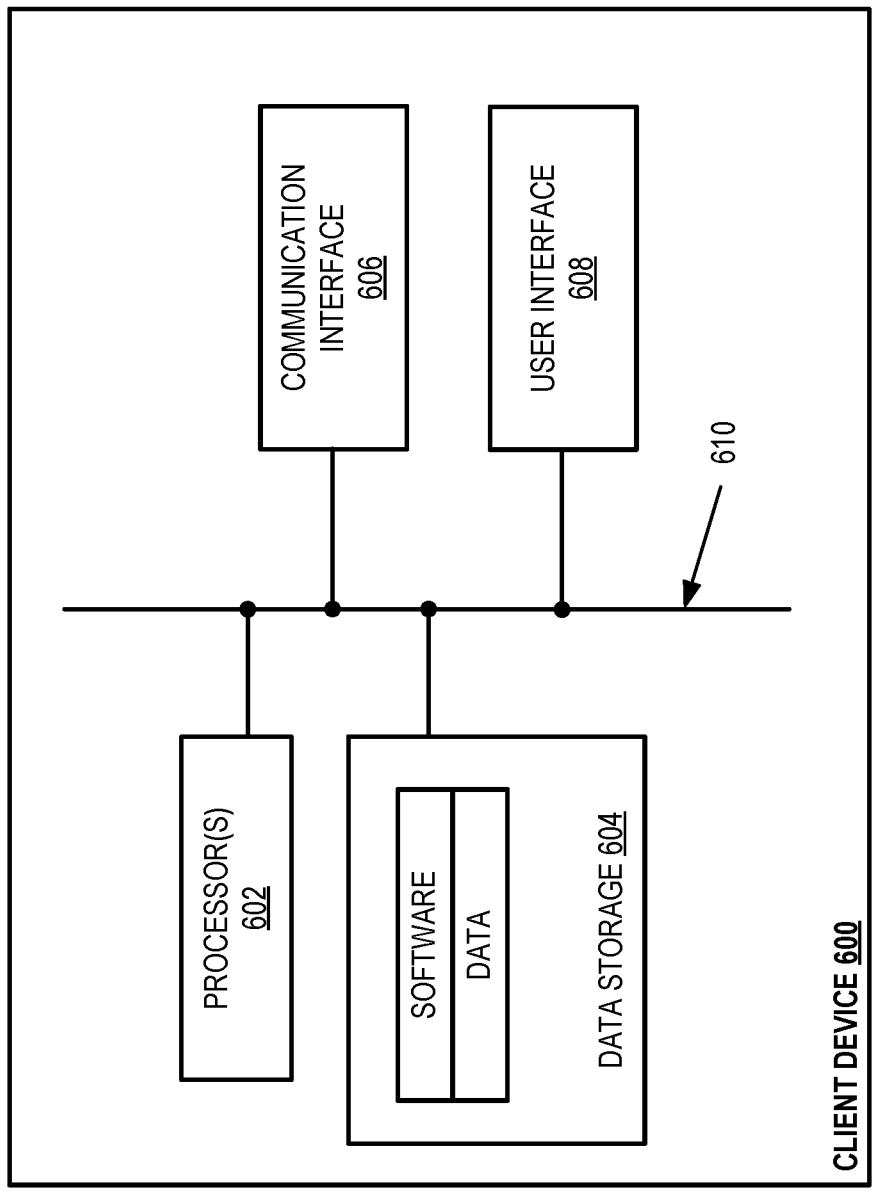
FIG. 6 is a simplified block diagram that illustrates some structural components that may be included in an example client device.

Turning now to FIG. 6, a simplified block diagram is provided to illustrate some structural components that may be included in an example client device 600. For example, client device 600 could serve as the client device 206 shown in FIG. 2 and may be configured to carry out any of the various subsystem functions disclosed herein—including but not limited to the functions performed by the client device 206 in the example communication diagram described with reference to FIG. 3. At a high level, client device 600 may generally comprise a processor 602, data storage 604, a communication interface 606, and a user interface 608, all of which may be communicatively linked by a communication link 610 that may take the form of a system bus or some other connection mechanism. Each of these components may take various forms.

For instance, processor 602 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 602 could comprise processing components that are distributed across a plurality of physical computing devices connected via a network, such as a computing cluster of a public, private, or hybrid cloud.

In turn, data storage 604 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 604 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 6, data storage 604 may be capable of storing both (i) program instructions that are executable by processor 602 such that the client device 600 is configured to perform any of the various functions disclosed herein (including but not limited to any the functions performed by the client device 206 described with reference to FIG. 3), and (ii) data that may be received, derived, or otherwise stored by client device 600.

Communication interface 606 may take the form of any one or more interfaces that facilitate communication between client device 600 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

The client device 600 may additionally include a user interface 608 for connecting to user-interface components that facilitate user interaction with the client device 600, such as a keyboard, a mouse, a trackpad, a display screen, a touch-sensitive interface, a stylus, a virtual-reality headset, and/or speakers, among other possibilities.

It should be understood that client device 600 is one example of a client device that may be used with the embodiments described herein. Numerous other arrangements are possible and contemplated herein.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

The invention claimed is:

1. A client device comprising:
one or more communication interfaces;
one or more processors;
data storage comprising one or more non-transitory computer-readable mediums; and
program instructions stored in the data storage that, when executed by the one or more processors, cause the client device to:
display an interface for requesting that a computing platform deploy a data science model, wherein the interface presents a list of deployment templates, and wherein each of the listed deployment templates is stored at the computing platform and comprises data specifying (i) a respective executable model package and (ii) a respective set of execution instructions for the respective executable model package;
receive, via the interface, a user request to deploy a new data science model, wherein the user request comprises:
a user selection, from the list of deployment templates, of a given deployment template for use in deploying the new data science model, wherein the given deployment template is stored at the computing platform and comprises data specifying (i) a given executable model package and (ii) a given set of execution instructions for the given executable model package; and
user input specifying a given set of configuration parameters for use in deploying the new data science model; and
after receiving the user request to deploy the new data science model, cause the computing platform to deploy the new data science model based on the given deployment template and the given set of configuration parameters by transmitting, to the computing platform over a network-based communication path, an indication of the user request to deploy the new data science model that includes (i) an identification of the given deployment template and (ii) data indicating the given set of configuration parameters.

2. The client device of claim 1, wherein the given set of configuration parameters for use in deploying the new data science model comprises either or both of (i) an identification of an input dataset for the new data science model or (ii) an identification of an output storage location for the new data science model.

3. The client device of claim 1, wherein the given set of configuration parameters for use in deploying the new data science model comprises a computing resource allocation to use for deploying the new data science model.

4. The client device of claim 1, wherein the given set of configuration parameters for use in deploying the new data science model comprises an indication of whether the new data science model is to be executed (i) manually or (ii) according to a schedule.

5. The client device of claim 1, wherein the list of deployment templates that is presented to the user is defined based on user permissions assigned to the user.

6. The client device of claim 1, wherein, after the user selection of the given deployment template is received, the interface presents an initial set of configuration parameters corresponding to the given deployment template, and wherein the user input specifying the given set of configuration parameters comprises one or both of (i) user input that adopts at least one configuration parameter in the initial set or (ii) user input that modifies at least one configuration parameter in the initial set.

7. The client device of claim 1, further comprising program instructions stored in the data storage that, when executed by the one or more processors, cause the client device to:
present an indication of a status of the new data science model after it has been deployed.

8. The client device of claim 7, wherein the status of the new data science model is expressed in terms of one or both of (i) execution status information or (ii) performance status information.

9. The client device of claim 1, wherein:
the given executable model package of the given deployment template comprises (a) a trained model object and (b) a pre-encoded set of pre-processing operations that are available for use with the trained model object; and
the given set of execution instructions of the given deployment template comprises instructions for (a) which one or more pre-processing operations from the pre-encoded set of pre-processing operations are to be used with the trained model object and (b) how the one or more pre-processing operations are to be arranged.

10. A non-transitory computer-readable medium, wherein the non-transitory computer-readable medium is provisioned with program instructions that, when executed by at least one processor, cause a client device to:
display an interface for requesting that a computing platform deploy a data science model, wherein the interface presents a list of deployment templates, and wherein each of the listed deployment templates is stored at the computing platform and comprises data specifying (i) a respective executable model package and (ii) a respective set of execution instructions for the respective executable model package;

receive, via the interface, a user request to deploy a new data science model, wherein the user request comprises:

a user selection, from the list of deployment templates, of a given deployment template for use in deploying the new data science model, wherein the given deployment template is stored at the computing platform and comprises data specifying (i) a given executable model package and (ii) a given set of execution instructions for the given executable model package; and user input specifying a given set of configuration parameters for use in deploying the new data science model; and after receiving the user request to deploy the new data science model, cause the computing platform to deploy the new data science model based on the given deployment template and the given set of configuration parameters by transmitting, to the computing platform over a network-based communication path, an indication of the user request to deploy the new data science model that includes (i) an identification of the given deployment template and (ii) data indicating the given set of configuration parameters.

11. The non-transitory computer-readable medium of claim 10, wherein the given set of configuration parameters for use in deploying the new data science model comprises one or more of (i) an identification of an input dataset for the new data science mode, (ii) an identification of an output storage location for the new data science model, (iii) a computing resource allocation to use for deploying the new data science model, or (iv) an indication of whether the new data science model is to be executed (a) manually or (b) according to a schedule.

12. The non-transitory computer-readable medium of claim 10, wherein the list of deployment templates that is presented to the user is defined based on user permissions assigned to the user.

13. The non-transitory computer-readable medium of claim 10, wherein, after the user selection of the given deployment template is received, the interface presents an initial set of configuration parameters corresponding to the given deployment template, and wherein the user input specifying the given set of configuration parameters comprises one or both of (i) user input that adopts at least one configuration parameter in the initial set or (ii) user input that modifies at least one configuration parameter in the initial set.

14. The non-transitory computer-readable medium of claim 10, wherein the non-transitory computer-readable medium is further provisioned with program instructions that, when executed by at least one processor, cause the client device to:

present an indication of a status of the new data science model after it has been deployed.

15. The non-transitory computer-readable medium of claim 10, wherein:

the given executable model package of the given deployment template comprises (a) a trained model object and (b) a pre-encoded set of pre-processing operations that are available for use with the trained model object; and the given set of execution instructions of the given deployment template comprises instructions for (a) which one or more pre-processing operations from the pre-encoded set of pre-processing operations are to be used with the trained model object and (b) how the one or more pre-processing operations are to be arranged.

16. A method carried out by a client device, the method comprising:

displaying an interface for requesting that a computing platform deploy a data science model, wherein the interface presents a list of deployment templates, and wherein each of the listed deployment templates is stored at the computing platform and comprises data specifying (i) a respective executable model package and (ii) a respective set of execution instructions for the respective executable model package;

receiving, via the interface, a user request to deploy a new data science model, wherein the user request comprises:

a user selection, from the list of deployment templates, of a given deployment template for use in deploying the new data science model, wherein the given deployment template is stored at the computing platform and comprises data specifying (i) a given executable model package and (ii) a given set of execution instructions for the given executable model package; and user input specifying a given set of configuration parameters for use in deploying the new data science model; and after receiving the user request to deploy the new data science model, causing the computing platform to deploy the new data science model based on the given deployment template and the given set of configuration parameters by transmitting, to the computing platform over a network-based communication path, an indication of the user request to deploy the new data science model that includes (i) an identification of the given deployment template and (ii) data indicating the given set of configuration parameters.

17. The method of claim 16, wherein the given set of configuration parameters for use in deploying the new data science model comprises one or more of (i) an identification of an input dataset for the new data science mode, (ii) an identification of an output storage location for the new data science model, (iii) a computing resource allocation to use for deploying the new data science model, or (iv) an indication of whether the new data science model is to be executed (a) manually or (b) according to a schedule.

18. The method of claim 16, wherein, after the user selection of the given deployment template is received, the interface presents an initial set of configuration parameters corresponding to the given deployment template, and wherein the user input specifying the given set of configuration parameters comprises one or both of (i) user input that adopts at least one configuration parameter in the initial set or (ii) user input that modifies at least one configuration parameter in the initial set.

19. The method of claim 16, further comprising:

presenting an indication of a status of the new data science model after it has been deployed.

20. The method of claim 16, wherein:

the given executable model package of the given deployment template comprises (a) a trained model object and (b) a pre-encoded set of pre-processing operations that are available for use with the trained model object; and the given set of execution instructions of the given deployment template comprises instructions for (a) which one or more pre-processing operations from the pre-encoded set of pre-processing operations are to be used with the trained model object and (b) how the one or more pre-processing operations are to be arranged.

\* \* \* \* \*